2 Sheets--Sheet 1.

W. V. GEE.

Loom.

No. 6,301.

Reissued Feb. 23, 1875.

Witnesses:

Villette Anderson
Frank B. Curtis

Inventor:

W. V. Gee
Chipman Hosmer & Co
Attys

THE GRAPHIC CO. PHOTO-LITH. 39 & 41 PARK PLACE, N.Y.

2 Sheets--Sheet 2.

W. V. GEE.

Loom.

No. 6,301. Reissued Feb. 23, 1875.

Witnesses:

Vellette Anderson

Frank B. Curtis

Inventor:

W. V. Gee

Chipman Fosner & Co

Attys

THE GRAPHIC CO. PHOTO-LITH. 39 & 41 PARK PLACE, N.Y.

BEST AVAILABLE COPY

UNITED STATES PATENT OFFICE.

WILLIAM V. GEE, OF PHILADELPHIA, PENNSYLVANIA.

IMPROVEMENT IN LOOMS.

Specification forming part of Letters Patent No. 120,510, dated October 31, 1871; reissue No. 6,301, dated February 23, 1875; application filed January 30, 1875.

*To all whom it may concern:*

Be it known that I, WILLIAM V. GEE, of Philadelphia, in the county of Philadelphia and State of Pennsylvania, have invented certain new and useful Improvements in Looms; and I do hereby declare that the following is a full, clear, and exact description of the construction and operation of the same, reference being had to the annexed drawings making a part of this specification, and to the letters and figures of reference marked thereon.

Figure 1:
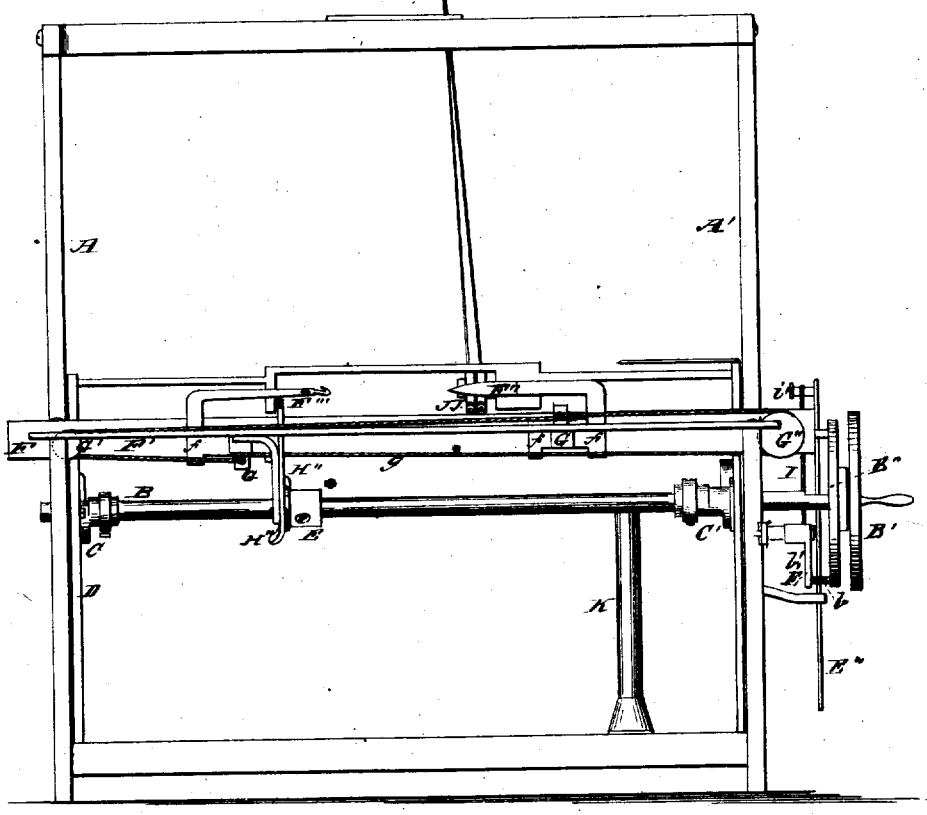
Figure 2:
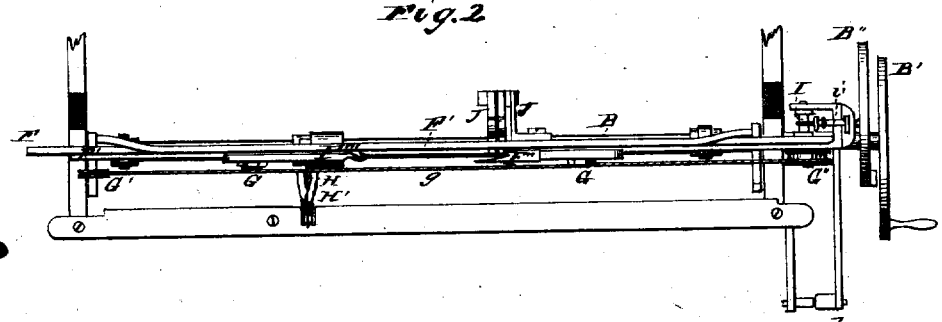
Figure 4:
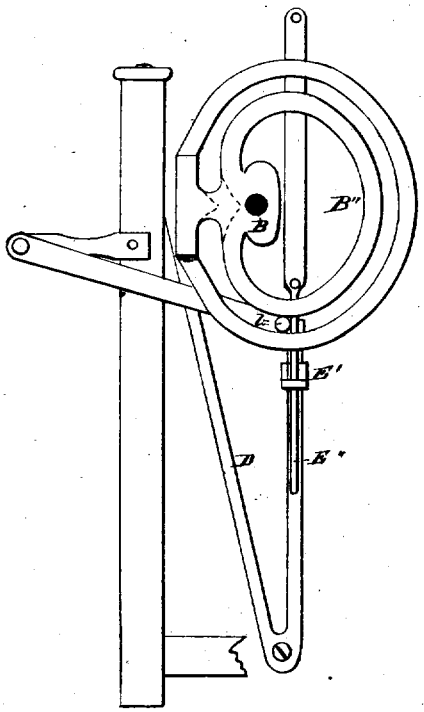
Figure 3:
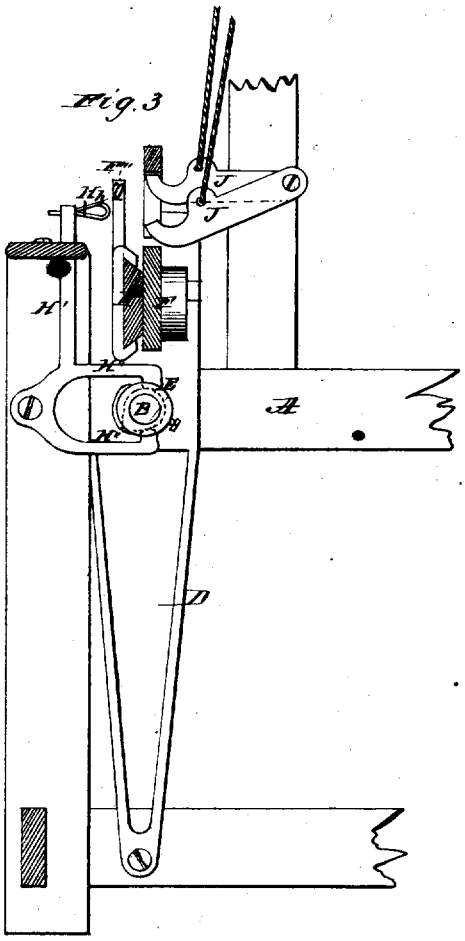

Figure 1 of the drawings is a front view of my device. Fig. 2 is a horizontal sectional view of the same, and Fig. 3 is a sectional detail view. Fig. 4 is a detail view.

This invention has relation to looms; and it consists in certain novel devices, hereinafter explained, by means of which the weft-carriers travel only one-half the usual distance required, thereby saving time and increasing the amount of work produced in a given time.

In the accompanying drawings, A A′ represent the ends of a loom-frame, A′ being the end to which the driving mechanism is applied. B is a transverse shaft, holding the eccentrics C C′, which operate the batten-frame D, and an eccentric, E, for controlling the operation of a device the function of which will be hereinafter detailed. On the driving end of the shaft B is a crank or driving wheel, $B^1$, and a grooved cam, $B^2$, on which travels a stud, *b*, projecting from an arm, *b′*, pivoted to a bracket which extends from the driving end of the loom-frame. The arm *b′* is connected by a link, $E^1$, with a bar, $E^2$, which is thereby operated to rise and descend through a slotted bracket secured to and projecting from the end of the batten-frame D. F designates a horizontal bar, which is supported on the batten-frame. $F^1$ is a bevel-edged horizontal race, upon which the finger $F^2$ and hook $F^3$, respectively, travel reciprocally, each being provided with dovetailed guides *f f* to support them on the race $F^1$. G G designate cleats, which are secured to the guide portions of the finger and hook and formed with eyes, by means of which a continuous cord, *g*, is attached thereto. This cord *g* passes over a pulley-wheel, $G^1$, journaled at one end of the race, and has both of its ends secured to a pulley-wheel, $G^2$, journaled at the opposite end of the race. The reciprocating rotary motion of the wheel $G^2$ operates the finger and hook, which alternately come together and separate, the end of the hook in the first instance entering the tubular portion of the finger, and there seizing the weft-yarn which the finger has carried with it from the edge of the warp half the distance across the same, and afterward drawing it to the opposite edge of the warp. Having reached the latter point the yarn is caught by a hook, H, on the end of an oscillating lever, $H^1$, constructed with jaws $H^2$, between which the eccentric E, previously referred to, rotates and oscillates said lever and the hook which it holds. A finger, *h*, properly attached to this hook, is made to close the latter after it has taken hold of a yarn and hold it until it has drawn the same forward some distance, when it opens automatically, and, falling back, allows the yarn-loop to pass over it, the hook $F^3$ at the same time reversing its travel for the purpose of seizing the next stretch of weft-yarn, and so on, the looped end of each succeeding stretch being taken as a link to form a chain selvage of the material which is being woven. I designates a pulley-wheel, which is journaled on the same shaft with the wheel $G^2$. A cord, *i*, which passes around wheel I, is connected by its ends to a stud, *i′*, projecting from the upper end of the bar $E^2$, and to the pin which connects together said bar and the link $E^1$. Thus, when the bar $E^2$ is made to rise and descend through the medium of the cam *b*, the cord *i* rotates the wheel I, and motion is communicated to the finger $F^2$ and hook $F^3$ to operate them, as before described. J J represent the "mails," having eyes through them, through which the weft-yarns are fed from the bobbins K to the finger $F^2$. These mails are hung on a transverse bar behind the batten-frame, and have cords connecting them with a jacquard attachment, which, being in general use, is not shown in the drawings. The mails are operated in the usual manner, each holding a different-colored yarn, which is brought into requisition when desired.

Having thus described my invention, what I claim as new, and desire to secure by Letters Patent, is—

1. In a loom, the reciprocating tubular finger $F^2$ and reciprocating hook $F^3$, in combination with the oscillating hook H, having finger *h*, operating automatically to discharge the yarn-loop, substantially as described.

2. The mails J J, in combination with the tubular finger $F^2$ and hook $F^3$, operating together substantially as described.

3. The combination of the finger and hook $F^2$ $F^3$, with guides *f*, race $F^1$, pulleys $G^1$ $G^2$ cord *g*, and operating devices, substantially as and for the purpose set forth.

4. The bar $E^2$, cam $B^2$, cord *i*, link $E^1$, arm *b'*, and pulley I, in combination with the cord *g*, pulleys $G^1$ $G^2$, finger $F^2$, and hook $F^3$, arranged to operate substantially as described.

In testimony that I claim the above I have hereunto subscribed my name in the presence of two witnesses.

WILLIAM V. GEE.

Attest:
JOHN DULIN,
PATRICK COOK.